Lawrence K. O'Neill
INVENTOR.

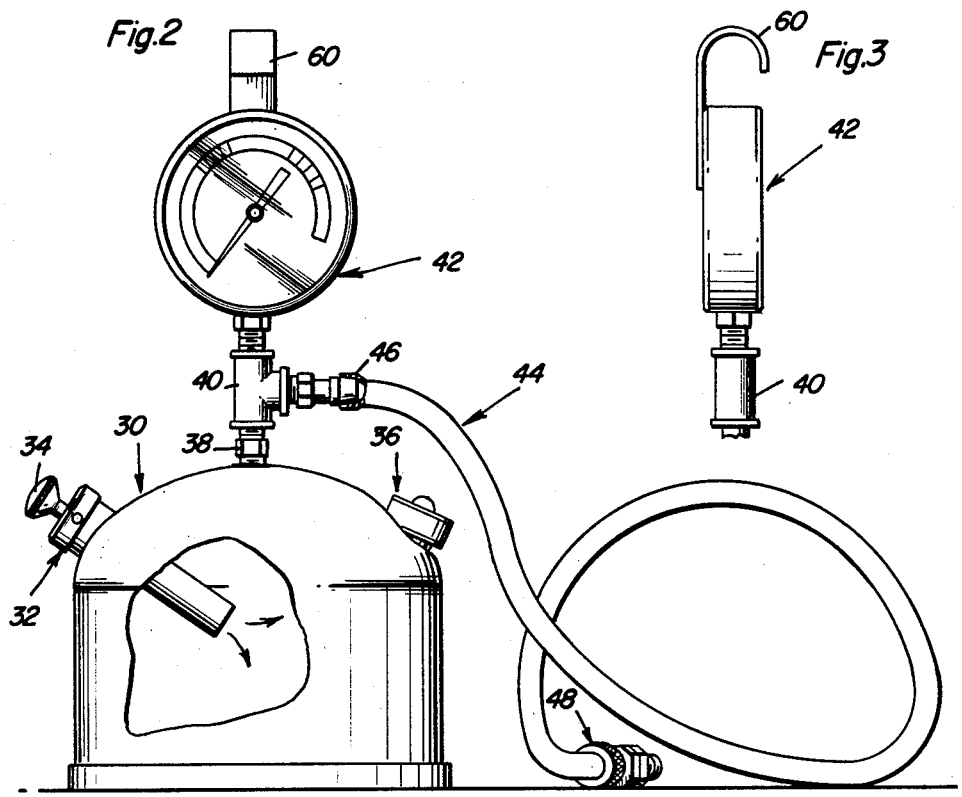
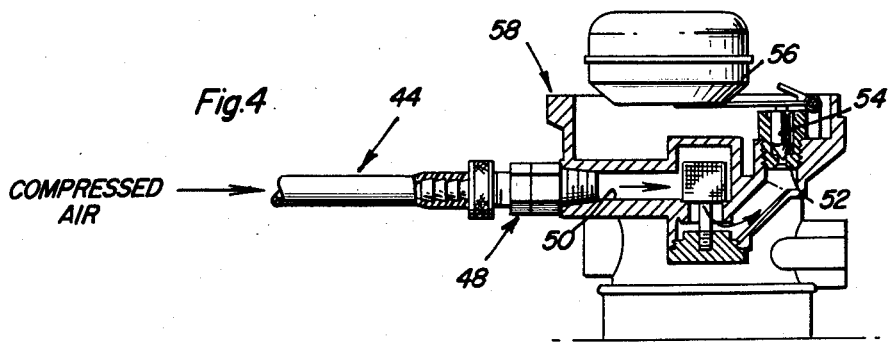

3,159,022
PNEUMATIC FLOAT VALVE TESTER
Lawrence K. O'Neill, P.O. Box 1296, Page, Ariz.
Filed Mar. 31, 1961, Ser. No. 99,736
5 Claims. (Cl. 73—49.7)

This invention relates to a pneumatic float valve tester and more particularly to a float valve tester specifically adapted to test the seating engagement of a float valve with its seat member by applying compressed air to the inlet fuel passage of an internal combustion engine carburetor with which the float valve is communicated.

In more recent years carburetors used in conjunction with internal combustion engines utilized in the manufacture of motor vehicles have become more greatly complicated. In the past an internal combustion engine was provided with a single carburetor having a single venturi passage. In more recent years however, internal combustion engines have been provided with a plurality of carburetors and each of the carburetors has been provided with from two to four venturi passages. In these more complicated types of carburetors a need arises for more than one float chamber and accordingly an internal combustion engine having a plurality of carburetors mounted thereon might be provided with as many as four or more carburetor float valves. The carburetor float valve is specifically adapted to maintain the level of fuel within the float chamber at a constant predetermined level and it is extremely important that this float level be accurately maintained if the operation of the internal combustion engine is to be kept at maximum efficiency.

In addition to being provided with a plurality of float chambers, the carburetors utilized for introducing air and fuel mixtures into the internal combustion engines being presently manufactured have become more complicated for reasons other than multiple float chambers. These more complex carburetors are for the most part harder to maintain in proper adjustment and are more adversely affected by an improperly maintained float level.

Accordingly, it is the main object of this invention to provide a float valve tester which will enable one or more float valves of a carburetor to be tested for satisfactory operation while the carburetor is partly disassembled and prior to its complete assembly and securement to an internal combustion engine.

A further object of this invention, in accordance with the immediately preceding object, is to provide a float valve tester which will provide a means whereby all of the float valves of a carburetor may be tested for proper operation while the carburetor is assembled and mounted on an internal combustion engine in its normal position relative thereto.

A further object of this invention is to provide a float valve tester which will enable air or liquid such as conventional liquid fuel or a testing liquid to be applied under pressure to the inlet passage of a carburetor in which the float valve is disposed.

A still further object of this invention is to provide a float valve tester in accordance with the preceding objects which may be readily adapted to substantially all types of carburetors.

An ancillary object of this invention is to provide a float valve tester which may be readily transported from one location to another.

A final object to be specifically enumerated herein is to provide a float valve tester which will conform to conventional forms of manufacture, be of simple construction and easy to operate so as to provide a device that will be economically feasible, long lasting and operable even by unskilled mechanics.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the pneumatic float valve tester, parts thereof being broken away;

Figure 1:
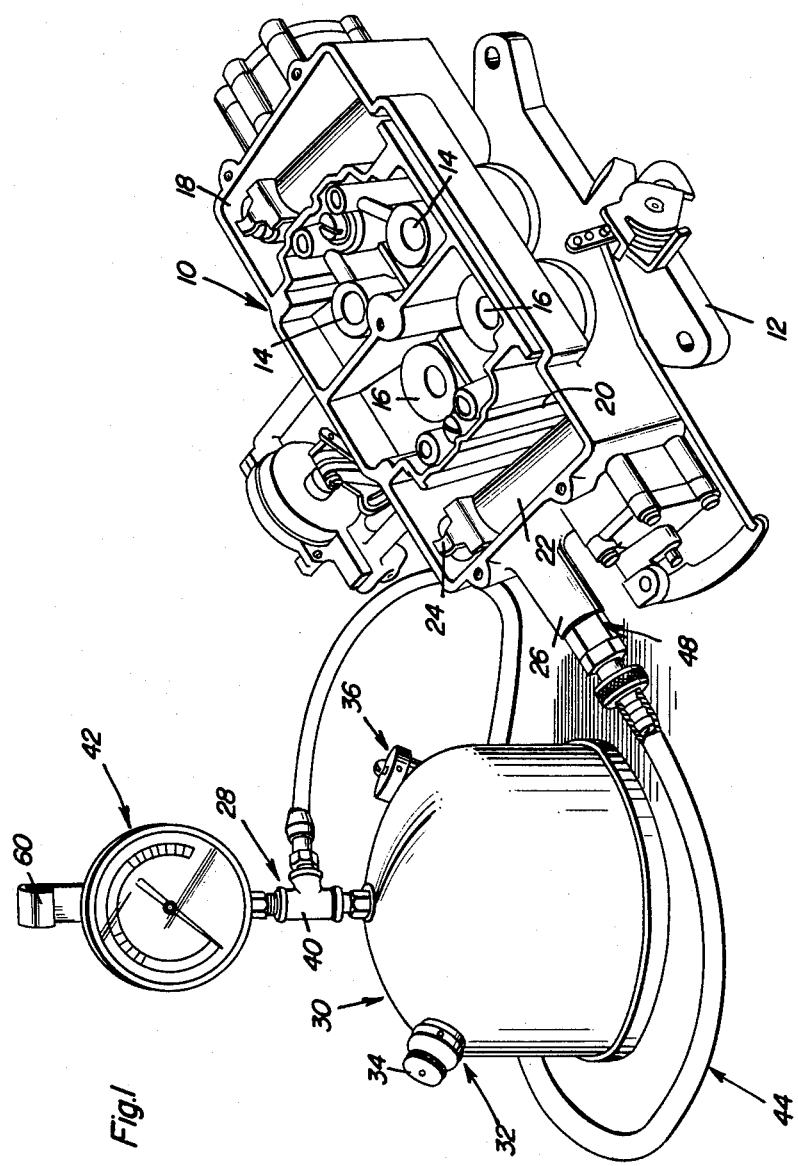
FIGURE 1 is a perspective view of the base portion of a four barrel carburetor provided with a pair of float chambers with the pneumatic float valve tester of the instant invention operatively connected to the fuel inlet passage of one of the float chambers.

FIGURE 3 is a fragmentary side elevational view of a portion of the float valve tester as seen from the left side of FIGURE 2; and FIGURE 4 is a fragmentary sectional view of an inverted portion of a carburetor showing the manner in which the float valve may be urged toward the closed position by inverting the float valve supporting portion of the carburetor, the flexible pressure line of the float valve tester being shown in communication with the fuel inlet passage of the carburetor in which the float valve is disposed.

Referring now more specifically to the drawings the numeral 10 generally designates the base of a conventional four barrel carburetor. The carburetor base 10 includes the usual mounting flange 12 for fixedly securing the base to the mounting flange of an internal combustion engine intake manifold and each of the two pair of venturi passages 14 and 16 is serviced by a float chamber. The float chamber 18 services the venturis 14 and the float chamber 20 services the venturis 16. Inasmuch as the float chambers 18 and 20 are substantially identical, only the float chamber 20 will hereinafter be specifically referred to.

A float member 22 is swingably mounted in the float chamber 20 and is provided with a lever arm 24 for urging a float valve (not shown) into engagement with its seat upon the raising of the float 22 to a predetermined level by the admittance of liquid fuel into the float chamber 20 through the inlet neck 26.

The float valve tester of the instant invention is generally designated by the reference numeral 28 and includes a hollow pressure vessel generally referred to by the reference numeral 30. The pressure vessel 30 is provided with a manually operable air pump generally designated by the reference numeral 32 which includes an operating knob 34. The operating knob 34 may be reciprocated in order to introduce air under pressure within the vessel 30. The vessel 30 is also provided with a pressure relief valve assembly generally referred to by the reference numeral 36 and it will be noted that the relief valve assembly may be opened and closed as desired. The vessel 30 includes an outlet fitting 38 to which a T-fitting 40 is secured. A pressure gauge generally referred to by the reference numeral 42 is secured to the T-fitting 40 and is thus communicated with the interior of the vessel 30. An outlet line generally referred to by the reference numeral 44 has one end connected to the T-fitting 40 as at 46 and is also thereby communicated with the interior of the vessel 30. The other end of the flexible outlet line 44 is provided with a fitting assembly generally referred to by the reference numeral 48 specifically adapted to be threadedly engaged in the inlet end of an inlet fuel passage 50, see FIGURE 4. The inlet fuel passage 50 has a float valve seat 52 disposed therein and a float valve member 54 is movable into and out of seating engagement with the seat 52 upon downward movement of the inverted float 56 comprising a part of the carburetor generally referred to by the reference numeral 58. The carburetor 58 is somewhat different than the base 10 in that the float 56 is carried by an upper portion of the carburetor 58 whereas the floats 22 are carried by the base 10. However, the operation of the float valve tester 28 is substantially identical in each instance. If it is desired the base 10 may be inverted as is the upper portion of the carburetor 58 in order to urge the corresponding float valve members (not shown) into seating engagement with their respective seats by movement of the floats 22 to a lowermost position by gravity when the base 10 is in the inverted position.

In using the float valve tester 28 the tester may be utilized as illustrated in FIGURES 1 and 4. Additionally, if it is desired to test the operation of carburetor float valves when the carburetor is completely assembled and secured on an internal combustion engine, the fuel line (not shown) may be disconnected from the inlet neck 26. Then, the fitting 48 may be threadedly engaged with the inlet end of the fuel passage in the neck 26. The end of the flexible outlet line adjacent the T-fitting 40 may be removed and liquid fuel and/or testing liquid may be admitted into the flexible outlet line 44. Then, the outlet line may again be secured to the T-fitting 40. The pressure vessel 30 may then be raised in order to position the upper end of the flexible line 44 at an elevation higher than the outlet end of the line 44 in order to insure that the liquid admitted into the line 44 will form a column in the outlet end of the line 44 and in the fuel inlet passage in the neck 26. Then, the pump 32 may be actuated to introduce air under pressure within the vessel 30. As the air pressure is raised in the vessel 30, the liquid admitted into the line 44 will be introduced into the float chamber 20 by means of the air pressure within the vessel 30 until the float 22 has been raised sufficiently to seat the associated float valve member. When the predetermined float level has been obtained, the pressure gauge 42 may be read. Then, at a given time interval the pressure gauge 42 may again be read to ascertain whether any of the liquid disposed between the float valve member and the compressed air has leaked past the float valve member.

It is to be noted that it is not necessary that a column of liquid be disposed between the compressed air and the float valve member but that in some instances the interposing of a column of liquid between the compressed air and the float valve member would give a more accurate indication as to whether or not the float valve member was properly seating.

It will be noted that the pressure gauge 42 is provided with a hook 60 whereby the pressure vessel 30 may be supported in an elevated position relative to the carburetor with which it is associated by means of any suitable support.

In addition to interposing a column of liquid fuel between the compressed air in the vessel 30 and the float valve member being tested, other suitable testing liquid may be substituted for the liquid fuel normally handled by the carburetor with which the tester is associated.

Thus, it may be observed that the tester 28 may be utilized to test not only the seating of float valves of partially disassembled carburetors, but that the tester 28 may also be used effectively to test the operation of float valves in completely assembled carburetors when they are secured in their normal position on an internal combustion engine. Accordingly, the operation of float valves may readily be tested in a minimum amount of time in order that it may be accurately and quickly determined whether a malfunction of a carburetor is due to malfunctioning of one or more of the float valves contained therein prior to the carburetor being disassembled. Also, the tester 28 may be utilized to effectively test the operation of float valves in partially disassembled carburetors prior to the carburetors being completely assembled and mounted on an internal combustion engine whereby at least one of the more frequently occurring malfunctions of a carburetor may be tested before the carburetor is fully assembled and mounted on an internal combustion engine after having been overhauled.

Further, if the carburetor in which the float valve being tested is secured is disassembled as illustrated in FIGURE 1 of the drawings, the float chambers 18 and 20 may be filled with a water and detergent solution. Then, if air leaks past the float valve the resultant air bubbles may be readily observed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is follows:

1. The method of testing the seating engagement of a float valve with a float valve seat of a carburetor of the type including a float chamber with a removable cover having a fuel inlet passage formed therein and including means at its outer end for engagement with the outlet end of a fuel line and having a float valve seat therein, said removable cover including a float valve supported therefrom for movement into and out of seated engagement with said float valve seat and operatively connected to a float arm having a float on one end and pivotally secured to said cover at the other end for urging said valve into seated engagement with said seat upon the rising of fuel in said chamber to a predetermined level, said method comprising the folowing steps; removing said cover from said carburetor and inverting said cover in order to close said valve, applying fluid under pressure to said inlet passage, and determining any loss in pressure of said applied fluid.

2. The method of claim 1 including the step of interposing a column of liquid fuel between said applied fluid and said valve.

3. The method of claim 1 including the step of interposing a column of testing liquid between said applied fluid and said valve.

4. The method of testing the seating engagement of a float valve in a carburetor of the type including a float chamber having an inlet passage communicated therewith and including means at its inlet end for registry with the outlet end of a fuel line and also including a float valve seat adjacent its outlet end, a float valve movable into and out of engagement with said float valve seat and engaged by a float arm having a float on one end disposed in said chamber and pivotally supported at its other end for movement of said arm to move said valve into seated engagement with said seat upon the rising of the fuel level in said chamber to a given level, said method comprising the following steps; introducing sufficient liquid fuel to said inlet passage in order to raise the fuel level in said chamber to said given level in order to close said valve, applying fluid under pressure to said inlet passage while maintaining a column of liquid fuel between said fluid under pressure and said valve, and determining any passage of fluid past said valve.

5. The method of testing the seating engagement of a float valve with a float valve seat of a carburetor of the type including a portion defining a fuel inlet passage with means at its inlet end adapted for communication with the outlet end of a fuel line and a downwardly facing float valve seat at its outlet end, said carburetor portion also having a float valve supported therefrom below said seat for upward movement into seated engagement with said float valve seat and operatively connected to a float arm disposed beneath said valve having a float on one end and being pivotally secured to said carburetor portion at the other end for urging said float valve upwardly into seated engagement with said seat upon upward movement of a portion of said arm disposed between the opposite ends thereof and engaged with said float valve toward said seat upon upward movement of said one end of said arm to a predetermined level by the buoyant force of liquid fuel on said float, said method comprising the following steps: inverting said carburetor portion in order that the weight of said valve, said float and said arm will urge said valve into seated engagement with said seat, applying fluid under pressure to said inlet end of said passage, and determining any loss in pressure of said applied fluid.

References Cited in the file of this patent
UNITED STATES PATENTS

| | | |
|---|---|---|
| 2,449,556 | Kirkley | Sept. 21, 1948 |
| 2,730,897 | Morse | Jan. 17, 1956 |
| 2,796,757 | Peterson | June 25, 1957 |
| 2,847,851 | Enell | Aug. 19, 1958 |